United States Patent [19]

Sakura et al.

[11] Patent Number: 4,516,208

[45] Date of Patent: May 7, 1985

[54] LABEL ISSUING APPARATUS WITH PROGRAMMABLE LABEL FEED

[75] Inventors: Yasuhiro Sakura, Mishima, Japan; Yasushi Nakajima, Richmond, England; Noriyasu Tajima, Mishima; Hitoshi Nimura, Shizuoka, both of Japan

[73] Assignee: Tokyo Electric Co. Ltd., Tokyo, Japan

[21] Appl. No.: 321,395

[22] Filed: Nov. 16, 1981

[30] Foreign Application Priority Data

Nov. 21, 1980 [JP] Japan .................. 55-164248
Nov. 21, 1980 [JP] Japan .................. 55-164249
Nov. 21, 1980 [JP] Japan .................. 55-164250
Nov. 21, 1980 [JP] Japan .................. 55-164251

[51] Int. Cl.³ ............................. G06F 15/20
[52] U.S. Cl. ..................... 364/466; 101/53; 156/384
[58] Field of Search .............. 101/53; 156/384; 364/464, 465, 466, 518, 519, 523

[56] References Cited

U.S. PATENT DOCUMENTS

| 3,620,161 | 11/1971 | Doran et al. ............. 101/291 |
| 4,301,878 | 11/1981 | Soe ..................... 364/466 X |
| 4,313,509 | 2/1982 | Engels .................. 364/466 X |
| 4,386,994 | 6/1983 | Fujii et al. ............ 364/466 X |

FOREIGN PATENT DOCUMENTS

| 1098371 | 3/1981 | Canada . |
| 0000657 | 2/1979 | European Pat. Off. . |
| 2949284 | 6/1981 | Fed. Rep. of Germany ...... 364/466 |
| 1503196 | 3/1978 | United Kingdom . |
| 1503194 | 3/1978 | United Kingdom . |

Primary Examiner—Joseph F. Ruggiero
Assistant Examiner—Allen MacDonald
Attorney, Agent, or Firm—Frishauf, Holtz, Goodman & Woodward

[57] ABSTRACT

A label issuing apparatus which feeds labels adhered in a line on a base carrier paper, is arranged to stop the feed of the labels at a first printing position and to print thereat on each label, and then to feed the labels so that printed labels issue from a label issuing outlet. The label issuing apparatus is comprised of a keyboard including a RAM having first and second memory areas, a set key, an execution key and ten numerical entry keys. The keyboard stores first and second feed distance data into the first and second memory areas when the keys are operated, and a feed control unit feeds the label carrier paper through a distance corresponding to the first feed distance data when a leading edge of a printed label is detected. The feed control unit sets and prints the label at the first printing position, and then feeds the carrier paper through a distance corresponding to the second distance data to define a second printing position.

10 Claims, 20 Drawing Figures

FIG. 4

| X\Y | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 1 | | F1 | F2 | F3 | F4 | F5 | F6 | F7 | F8 | CR1 | CR2 | F9 | F10 | | | |
| 2 | | UPR | | | | SR | | | WR | | | PR | | | | |
| 3 | | NR | | | | | | | DR | | | ACR | | | | |
| 4 | | | | | | | | | EDR | | | NDR | | | | |
| 5 | | EACR | | EUPR | | ETR | | | | EEDR | | | | | | |
| 6 | | RACR | | RUPR | | RTR | | | | RDR | | | | | | |
| 7 | | | | | | | | | PBR | REDR | | | | | | |
| | | | | | | | | | | | | | | | | |
| A | | FR1 | FR2 | | PR1 | | PR2 | | | | PDR | | | FEDR | | |
| B | | NPR1 | | TWR1 | | | TPR1 | | | | | | | | | |
| C | | NPR2 | | TWR2 | | | TPR2 | | | | | | | | | |
| D | | NPR3 | | TWR3 | | | TPR3 | | | | | | | | | |
| E | | NPR4 | | TWR4 | | | TPR4 | | | | | | | | | |

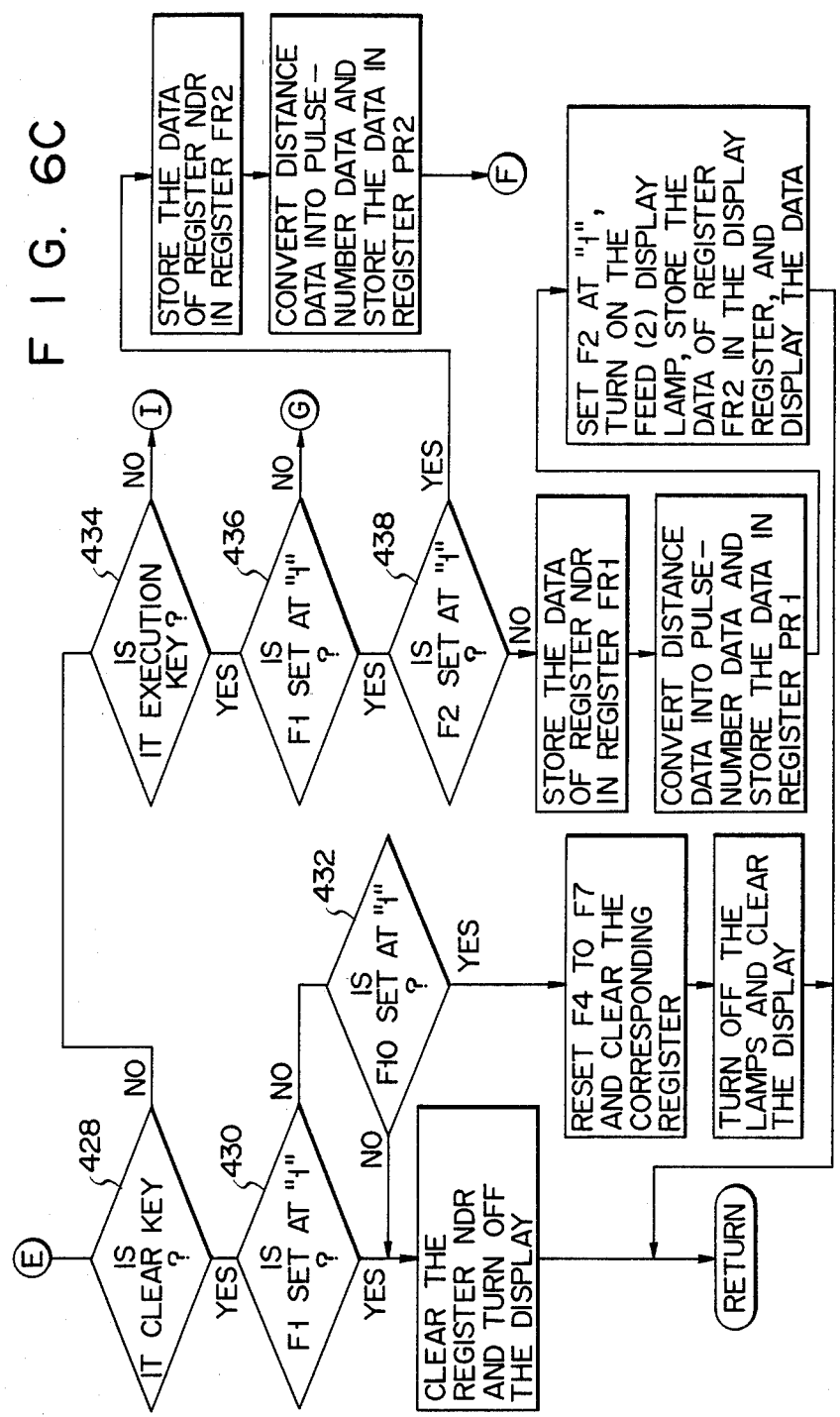

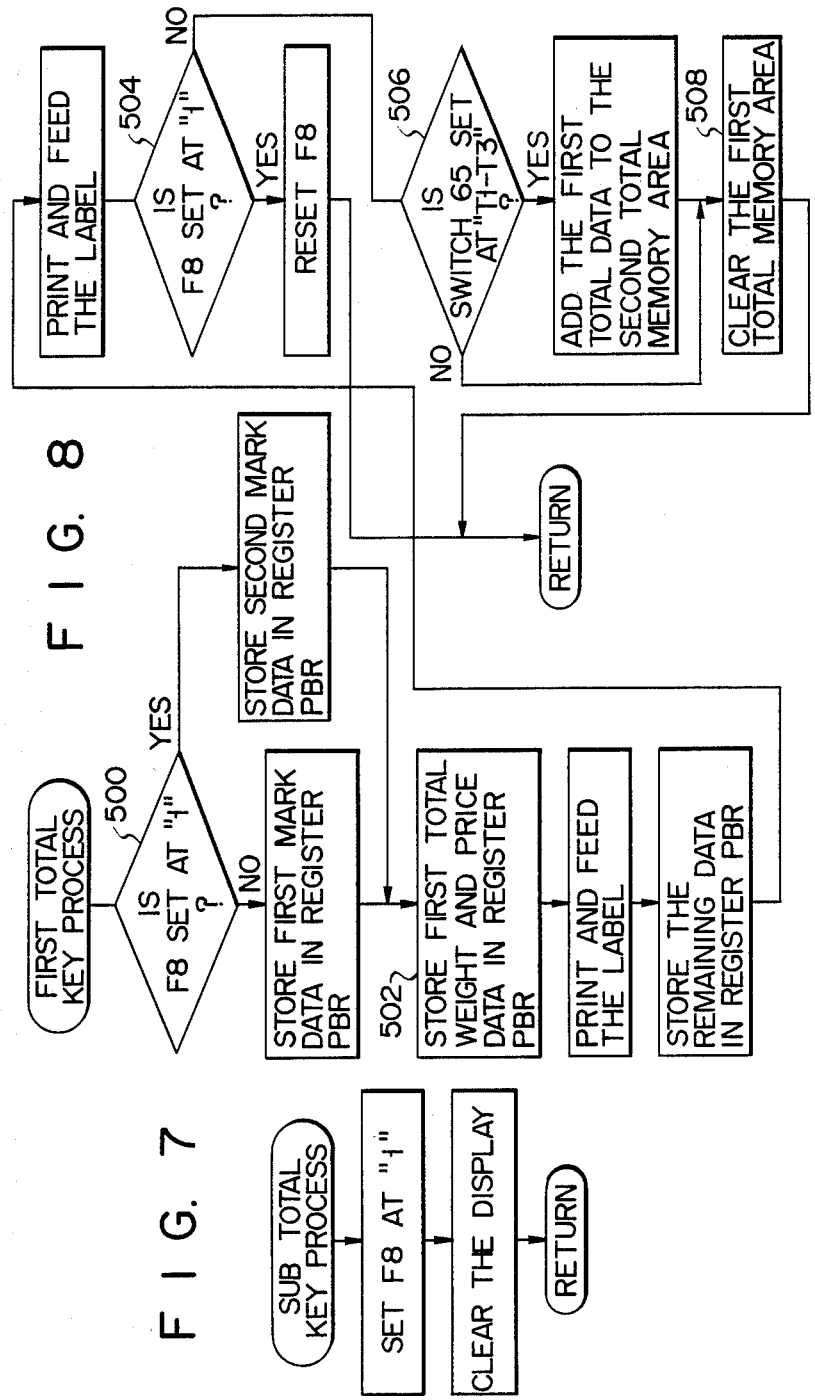

F I G. 13
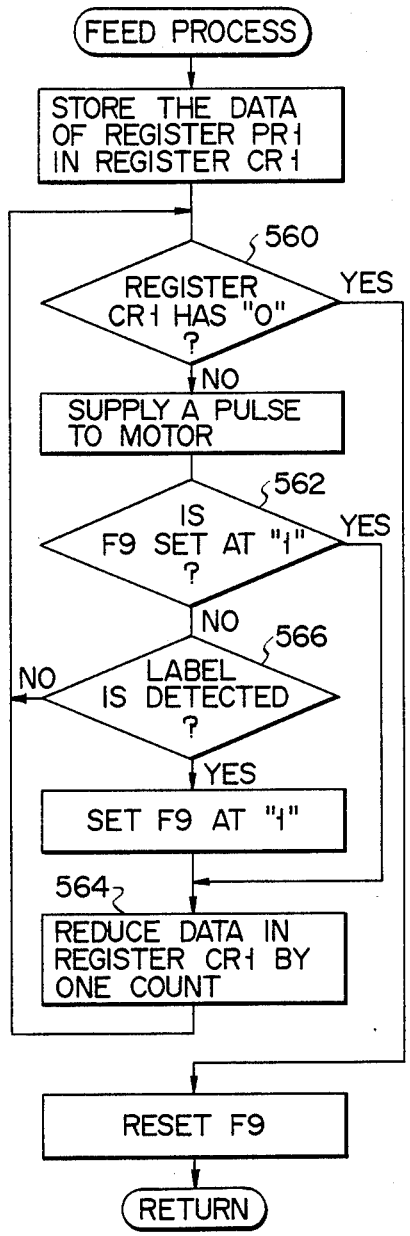

F I G. 14

| | UNIT PRICE | WEIGHT | PRICE | |
|---|---|---|---|---|
| | 100 | 3.6 Kg | 360 | |
| 80. 11. 10 | 80. 12. 10 | 0.05 | 9 | 23 |
| PACKED DATE | EFCT-DATE | TARE | TIME | CODE |

"NAME OF ARTICLE"

F I G. 15

| | UNIT PRICE | WEIGHT | PRICE | |
|---|---|---|---|---|
| 1✳ | 263.5Kg | | 38700 | |
| 80. 11. 10 | | 4.5 | 9 | 23 |
| PACKED DATE | EFCT-DATE | TARE | TIME | CODE |

"NAME OF ARTICLE"

LABEL ISSUING APPARATUS WITH PROGRAMMABLE LABEL FEED

BACKGROUND OF THE INVENTION

The invention relates to a label issuing apparatus. There are known label issuing apparatus which issue labels to be fixed on packages of foodstuffs or the like, with data such as the name, weight and price of the packaged food. In a prior label issuing apparatus, a first label detector is disposed near a label issuing outlet, and the start of printing by a printer for printing given data on the label is controlled in response to a signal from the first label detector. A second label detector is located behind the printer and the feed of the label is controlled in accordance with a signal produced from the second label detector. The first label detector disposed in front is used to prevent any overlap of labels at the label issuing outlet, and prohibits the printing and feeding by the label issuing apparatus when the preceding label remains at the label issuing outlet. The second label detector disposed behind is used for stopping the label feeding, so as to set a label to be printed at a predetermined printing position when it detects a label located immediately after, or a certain number of labels behind the label to be printed.

However, with this kind of prior label issuing apparatus, a change in the size of labels requires adjustment of the location of the second label detector, because unless it is adjusted, when the second label detector detects a label and stops the label feeding, the label is located at an improper printing position. Such adjustment of the location needs to be done by repeating the label issuance several times, while it is checked whether or not given data is printed on the correct printing position on the label. Thus, the adjustment is considerably time-consuming and has a drawback of wasteful issuance of some labels. Moreover, the need of using two label detectors is another shortcoming of the prior apparatus. Further, the controlling of the label feeding by means of the second label detector disposed behind the printer, could lead to a situation where the position of the label under printing deviates remarkably from the proper printing position as a cumulative result of any variability in spacing or in the spacing between labels on their label carrier paper tape.

Additionally, the prior label issuing apparatus employs a hardware timer for controlling the feed distance from one line to another to print data on a label over several lines. Owing to this fact, a change in the line feed distance resulting from a label size change requires a troublesome adjustment for the feed distance correction.

SUMMARY OF THE INVENTION

Accordingly, an object of the present invention is to provide a label issuing apparatus which uses a single label detector and can readily adjust a print setting position even if the size of the label changes.

According to one aspect of the present invention, there is provided a label issuing apparatus comprising: label feed means for feeding labels adhered on a label carrier; separator means for peeling the label off the label carrier; label detecting means disposed in the vicinity of the separator means for detecting that portion of the label which is peeled off the label carrier by the separator means; printing means for printing the label; data storing means having first and second memory areas for respectively storing first and second feed distance data; keyboard means having a plurality of keys selectively operative to write first and second feed distance data in the first and second memory areas; and data processing means for controlling the label feed means to feed the label carrier through a first distance defined by the first feed distance data stored in the first memory area after the label detecting means has detected the peeled-off front edge of the label and to set at least one of the labels in a first printing position, and after the label is printed in the first printing position, to feed the label carrier through a second distance defined by the second feed distance data stored in the second memory area from the first printing position.

In the present invention, a feed distance of the label is defined by the first and second feed distance data written into the first and second memory areas through the operation of a plurality of keys. Therefore, the feed distance of the label can easily be set even when the label spacing size is changed or label intervals vary.

BRIEF DESCRIPTION OF THE DRAWINGS

FIG. 4 illustrates a memory map of part of a random access memory used in the control circuit shown in FIG. 3;

FIGS. 7 to 11 show flow charts illustrating the key processing operation of a subtotal key and first to fourth total keys in the flow chart shown in FIG. 6B;

FIG. 13 shows a flow chart of the feed processing operation when no short distance feed is performed in the flow chart in FIG. 5; and FIGS. 14 and 15 show examples of labels issued from the label issuing apparatus according to the present invention.

DETAILED DESCRIPTION OF THE PREFERRED EMBODIMENT

Figure 1:
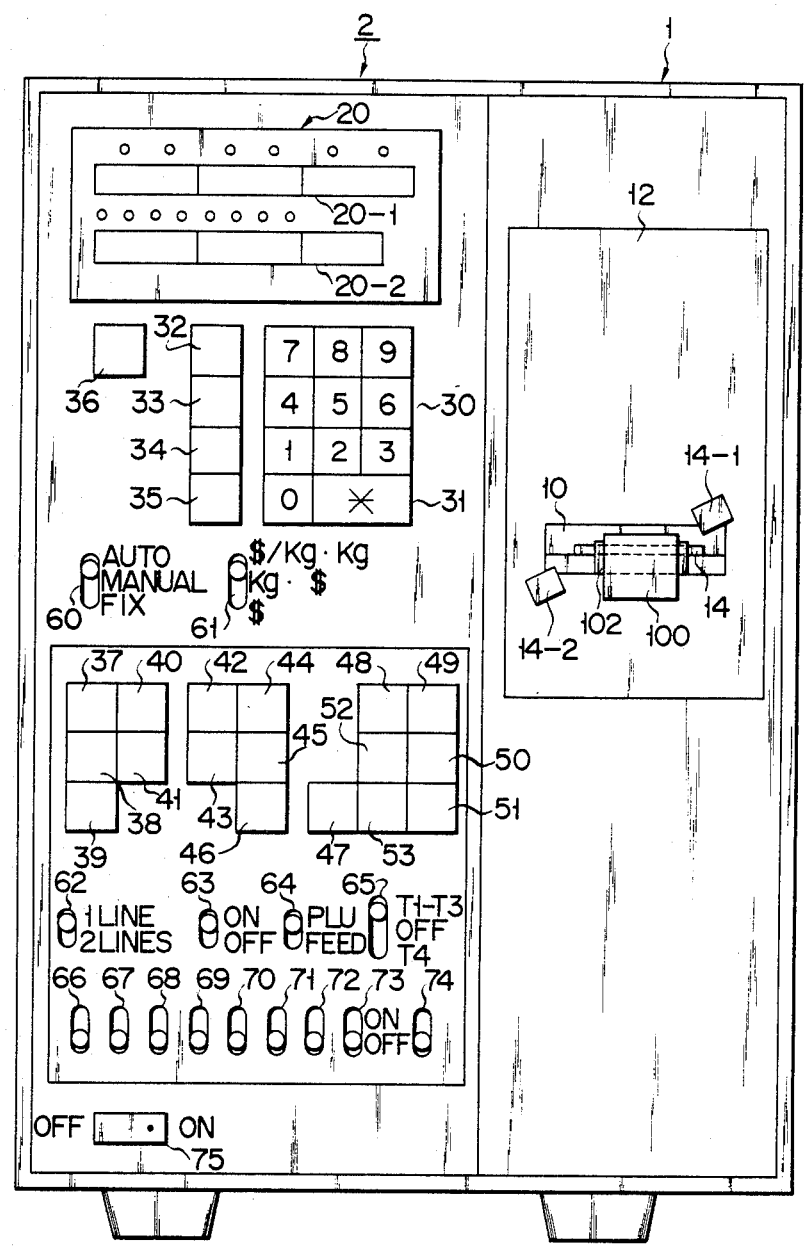
FIG. 1 shows a front view of a label issuing apparatus according to an embodiment of the present invention.

FIG. 1 shows a front view of a label issuing apparatus according to an embodiment of the present invention. The label issuing apparatus includes a label issuing section 1 and a manual operating section 2. The label issuing section 1 has a label issuing outlet 10 formed in a cover 12 and a label detector 14 having a light-emitting element 14-1 and a light sensing element 14-2 mounted on the cover 12. The operating section 2 has a display device 20 and key and switch groups to be described later. The display device 20 has a 16-digit display unit 20-1 and a 14-digit display unit 20-2. The left five digits of the display unit 20-1 are used as a unit price display section; the middle five digits as a weight display section; and the right six digits are used as a price display section. Indicator lamps of feed (1) and feed (2) are disposed in a position corresponding to the unit price display section. Zero and tare indicator lamps are provided in a position corresponding to the price display section. The left five digits of the display unit 20-2 are used as a numeral display section; the middle five digits as a time display section; and the right four digits as an article code display section. Indicator lamps for the number of articles, weight, the number of packs and department code are disposed in a position corresponding to the aforesaid numeral display section. Indication lamps for date (1), date (2), time and the number of effective days are disposed in a position corresponding to the date and time display section.

The key group of the operating section 2 includes numeral entry keys 30, an execution key 31, a label feed key 32, a tare setting key 33, a tare key 34, a clear key 35, a zero setting key 36, a count preset key 37, a weight preset key 38, a number-of-packs setting key 39, a section code key 40, a correction key 41, a date (1) key 42, a date (2) key 43, a time key 44, a price look-up (PLU) readout key 45, an article code key 46, a set key 47, a subtotal key 48, a first total key 49, a second total key 50, a third total key 51, a fourth total key 52, and a self-illumination type auto-minus key 53.

The switch group includes a label issuing mode selection switch 60 for selectively setting a label issuing mode to "automatic", "manual" or "print-fix", a printing item set switch 61 for selectively setting the print contents to "unit price and weight", "weight and price" or "price" in a print fixing mode, a printing switch 62 for selecting "one-line" or "two-lines" for the printing line, a compulsory tare switch 63 for permitting the operation of the apparatus only when a tare is set in an ON state of the tare switch, a data designating key 64 for designating PLU data or feed distance data for the contents keyed-in by the set key 47, and an addition switch 65 for designating a total memory to which addition data is loaded. Further, the lower part of the operation panel 2 has an array of a first date switch 66, a second date switch 67, a tare switch 68, a time switch 69, a department code switch 70, a unit price switch 71, a weight switch 72 and on-off switch 73. In addition, a label switch 74 for determining if the label is issued or not, and a power switch 75 are located on the lower part of the panel.

Figure 2:
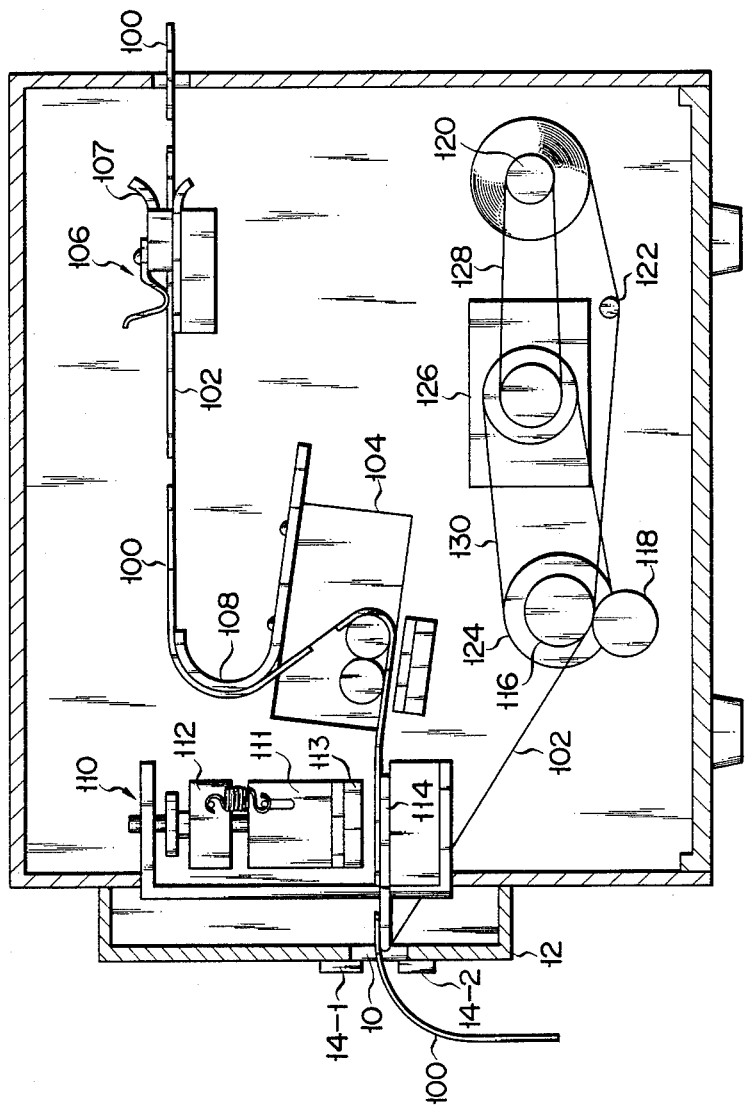
FIG. 2 shows a schematic diagram of a label issuing mechanism of the label issuing apparatus shown in FIG. 1.

FIG. 2 is a schematic diagram showing a label issuing mechanism for illustrating the label carrier, printing, and issuing functions of the label issuing section 1.

The labels 100 are adhered sequentially on a ground or base paper tape 102 at given intervals. The labels are fed from a label supply roll (not shown) by means of the ground paper tape 102. The labels 100 fed from the label supply roll come into the label issuing section 1 through the back of the section. The labels 100 introduced into the label issuing section 1 are supplied to a printer 104 through a label holding mechanism 106 with a label guide 107 and then a label guide 108. The printer 104 prints unit price, weight, price, department code, the number of effective days, tare, etc. of an article on given locations of the corresponding label. As will be described later, the printer 104 does not execute the printing operation if the label detector 14 detects a label lodged at the label issuing outlet.

The label, after it is printed by the printer 104, is fed to a stamp unit 110 where the name of the article is printed on the label. The stamp unit 110 includes an article name type holder 111, a solenoid 112 to move the type holder 111 up and down, and an article name type 113 removably mounted on the type holder 111. The article name type 113 has a blade-like extension in which a setting position detecting hole and article code holes are formed. Further, the stamp unit 110 has a label peeling plate 114 which peels the label 100 off the ground paper tape 102 when the label is moved toward the label issuing outlet 10 after the article name is printed on the label.

The label thus separated from the paper tape 102 is taken out of the label issuing outlet 10 and affixed to a package of the article. The paper tape 102, after the removal of the label, is moved forward while being held between a rubber roller 116 and a carrier paper tape feed roller 118, and after passing a guide roller 122, it is wound around a carrier paper tape take-up roller 120. The rubber roller 116 has a pulley 124 fixed coaxially thereto. The carrier paper tape receiving roller 120 and the pulley 124 are driven by a step motor 126, through belts 128 and 130, respectively.

Figure 3:
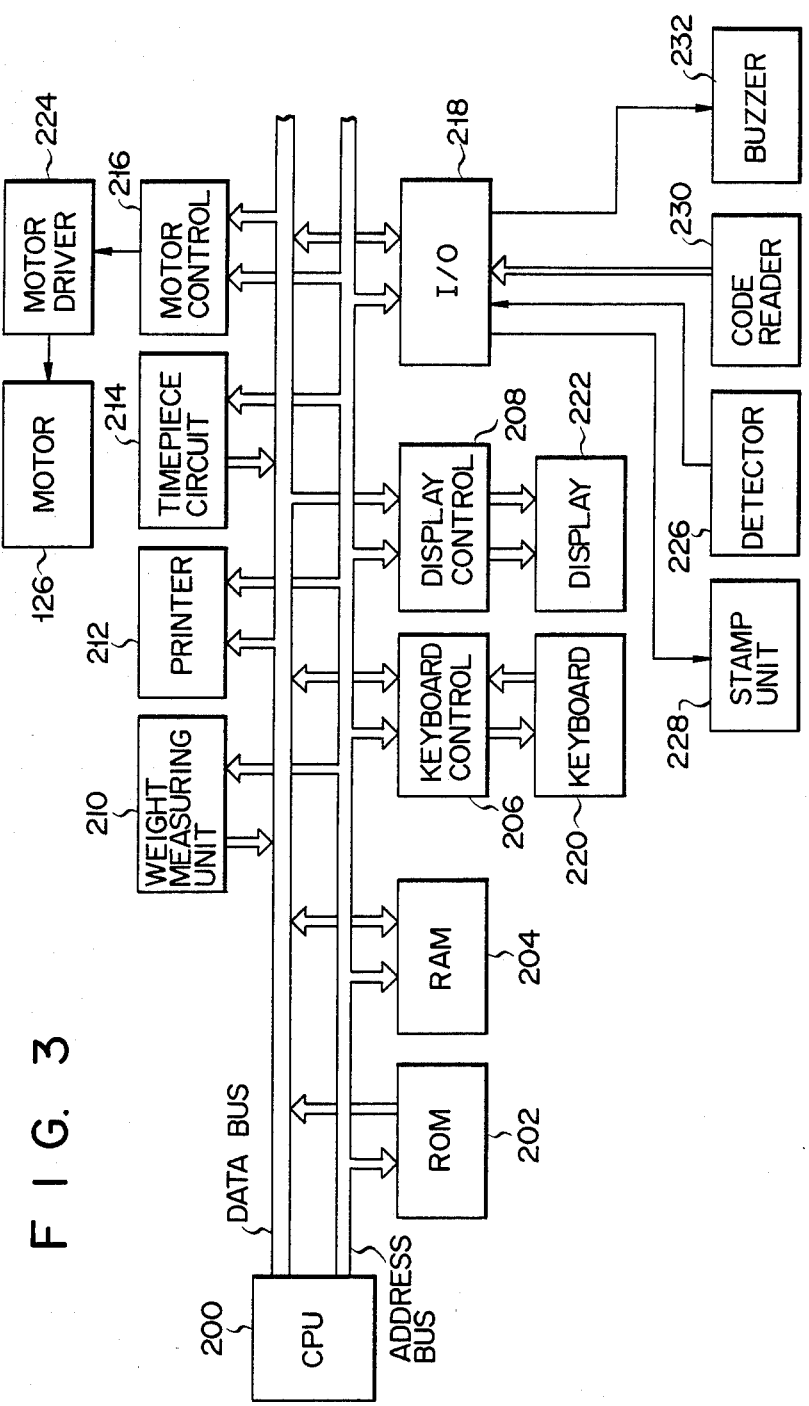
FIG. 3 is a circuit diagram of the label issuing apparatus shown in FIG. 1.

FIG. 3 shows a block diagram of a control circuit used in the label issuing device shown in FIG. 2. The control circuit has a central processing unit (CPU) 200 including an operation circuit, an instruction decoder, a memory control unit and the like, a read only memory (ROM) 202 for storing data of the program to be executed by the CPU 200, and a random access memory (RAM) 204 including various registers and memory sections for storing the data of the result of the operation by the CPU 200. Further, the CPU 200 is coupled with a keyboard control unit 206, a display control unit 208, a weight measuring unit 210, a printer 212 corresponding to the printer 104 shown in FIG. 2, a time counter 214, a motor control unit 216 and an input/output (I/O) unit 218 by way of an address bus and a data bus.

The keyboard control unit 206 is coupled with a keyboard 220 corresponding to the key and switch groups shown in FIG. 1 to supply to the CPU 200 the data according to the operation of keys or switches in the key and switch groups. The display control unit 208 is coupled with a display unit 222 corresponding to the display device 20 shown in FIG. 1, and drives the display unit 222 according to display data from the CPU 200. The motor control unit 216, coupled to a motor driver 224 to drive the motor 126 shown in FIG. 2, supplies a drive signal to the motor driver 224 corresponding to label feed data from the CPU 200 to thereby rotate the motor 126. The I/O unit 218 is coupled with a detector 226 corresponding to the detector 14 shown in FIG. 1, a stamp unit 228 corresponding to the stamp unit 110 shown in FIG. 2, a code reader unit 230 to read out article name data in the article stamp 113 shown in FIG. 2, and a buzzer 232.

When an improper set of the article stamp 113 is detected by the code reader unit 230, the CPU 200 supplies alarm data to the I/O unit 218. Then, the I/O unit 218 supplies an energizing signal to the buzzer 232 to sound an alarm. On the other hand, when a proper set of the article stamp 113 is detected by the code reader unit 230, the CPU 200 detects an article code which is read out by the code reader unit 230 in an optical manner, for example. Then, the CPU 200 reads out from the RAM 204 preset data concerning unit price, department and the like corresponding to the article code.

FIG. 4 shows a memory map of the RAM 204. In the memory area of address locations (1, 0) to (1, 7) in the RAM 204, flag data of a feed set flag F1, a *1 flag F2, an auto-minus flag F3, a B3 flag F4, a B4 flag F5, a B5 flag F6, a B6 flag F7 and a subtotal flag F8 are stored. A first count register CR1 is allotted to address locations (1, 8) and (1, 9). A second count register CR2 is allotted to address locations (1, A) and (1, B). Meanwhile, flag data of a label detecting flag F9 and a PLU set flag F10 are stored into address locations (1, C) and (1, D). The memory area of address locations (2, 0) to (2, F) is used as display registers for storing data to be displayed on the display unit 20-1 shown in FIG. 1. A unit price register UPR is allotted to address locations (2, 0) to (2, 4); a sign register SR to address location (2, 5); a weight register WR to address locations (2, 6) to (2, 9); and a price register PR is allotted to address locations (2, A) to (2, F). The memory areas of address locations (3, 0) to (3, D) is used as display registers for storing data displayed in the display unit 20-2. Numeral value register NR is allotted to address locations (3, 0) to (3, 5); a date register DR to address locations (3, 6) to (3, A); and an article name code register ACR to address locations (3, B) to (3, D). Further, a numeral data register NDR is allotted to address locations (4, B) to (4, F). The memory area to which the data in the numeral data register NDR is transferred is allotted to address locations (5, 0) to (5, 8). Specifically, an entered article code register EACR; entered unit price register EUPR; entered tare register ETR; entered department register EDR; and entered effective-days register EEDR are respectively allotted to address locations (5, 0) and (5, 1); (5, 2) to (5, 4); (5, 5) and (5, 6); (5, 7); and (5, 8). A memory area to which data read out from the RAM 204 is written is allotted to address locations (6, 0) to (6, 8). Specifically, a readout article code register RACR; readout unit price register RUPR; readout tare register RTR; readout department register RDR; and readout effective-days register REDR are respectively allotted to address locations (6, 0) and (6, 1); (6, 2) to (6, 4); (6, 5) and (6, 6); (6, 7); and (6, 8). To address locations (7, 0) to (7, F), a print buffer register PBR is allotted. A feed (1) register FR1, a feed (2) register FR2, a pulse (1) register PR1, a pulse (2) register PR2, a packed-date register PDR, and a final-effective-date register FEDR are respectively allotted to address locations (A, 0) and (A, 1); (A, 2) and (A, 3); (A, 4) and (A, 5); (A, 6) and (A, 7); (A, 8) to (A, B); and (A, C) to (A, F). Further, first to fourth total memory areas are allotted to address locations (B, 0) to (B, 9); (C, 0) to (C, 9); (D, 0) to (D, 9); and (E, 0) to (E, 9), respectively. A total-number-of-packs register NPR1, a total weight region TWR1, and a total price region TPR1, respectively, are allotted to address locations (B, 0) and (B, 1); (B, 2) to (B, 5); and (B, 6) to (B, 9) of the first total memory area. As in the first total memory area, total-number-of-packs registers NPR2 to NPR4, total weight registers TWR2 to TWR4, and total price registers TPR2 to TPR4 are allotted to the second to fourth total memory areas.

The RAM 204 has a PLU memory area for storing data of unit price, tare, department code and effective days corresponding to each article code, although not shown.

Figure 5A:
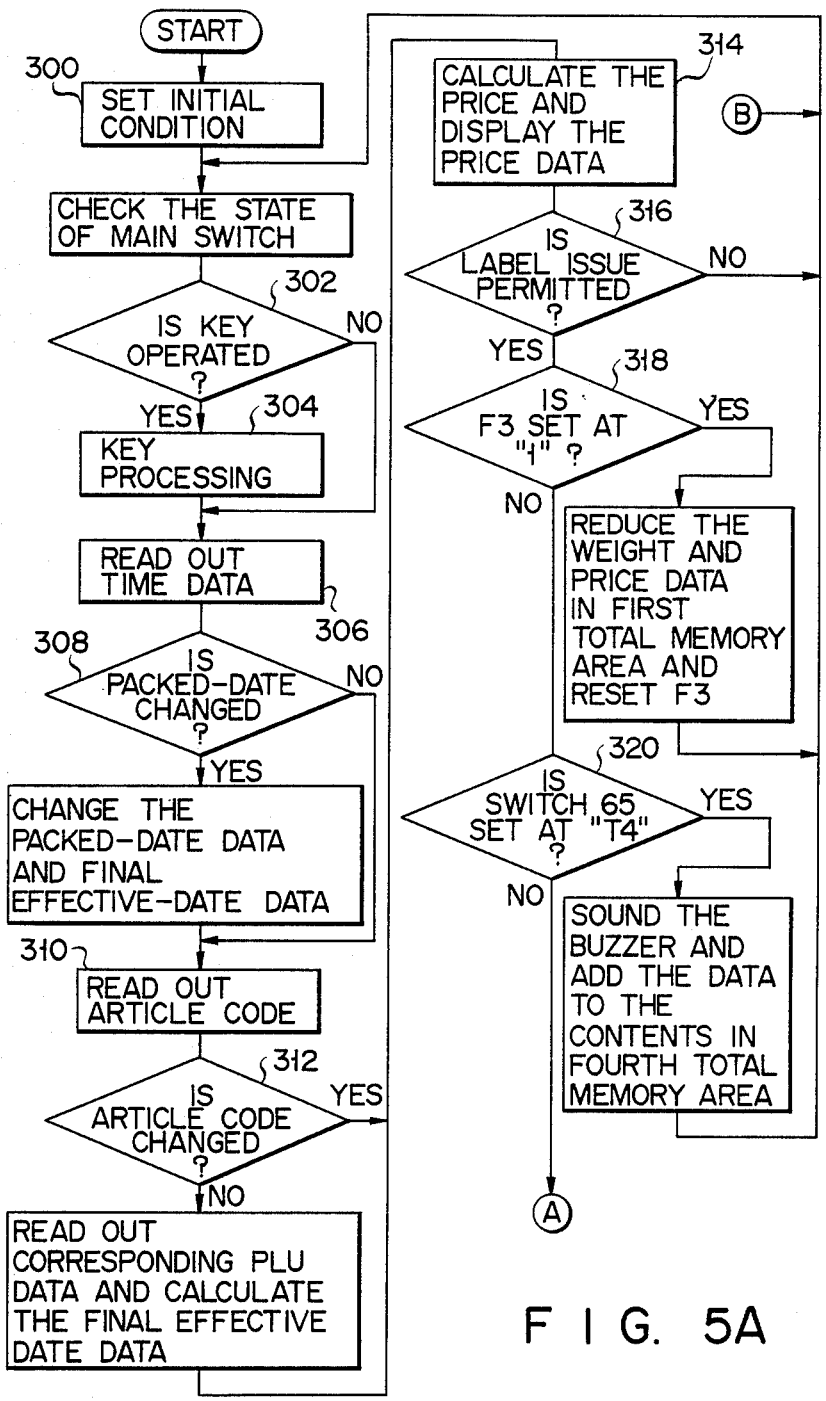
FIGS. 5A and 5B cooperate to form a flow chart for illustrating the operation of the label issuing apparatus shown in FIGS. 1 to 3.
Figure 5B:
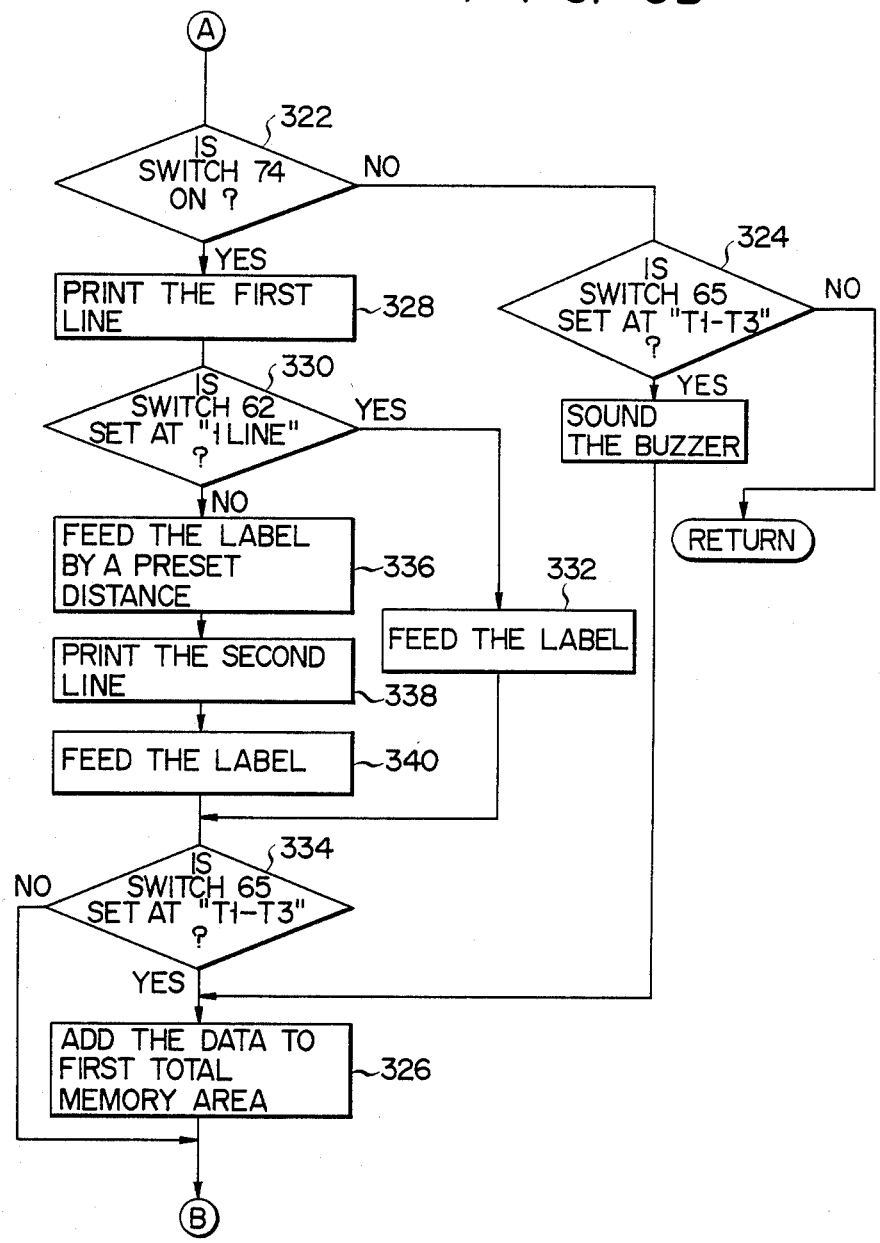

The operation of the control circuit shown in FIG. 3 will be described with reference to a flow chart shown in FIGS. 5A and 5B.

Upon the turn on of the power switch 75, an initial state or condition is set. For setting the initial state, the RAM 204 is cleared, the state of the display unit 222 is checked, states of all the switches except the label issuing mode selection switch 60 are checked, and according to the result of the check, flags are set in corresponding flag registers (not shown) in the RAM 204. In the next step 300, the set position of the main service switch or the issuing mode selection switch 60 is detected. Then, in a step 302, it is checked whether a key is operated or not. When the key operation is detected, in a step 306 following the execution of a key processing step 304 to be described referring to FIGS. 6A to 6E and FIGS. 7 to 11, time data such as year, month, day, hour, and minute are read out from timepiece circuit 214. The "hour and minute" data read out are transferred to the time register of the RAM 204. The readout date data is compared with the contents of the packed-date register PDR in a step 308. In the comparison, if both the date data are coincident with each other, an article reading step 310 is executed. When the data are not coincident with each other, the step 310 is executed after the packed date data and the final effective date data are updated. In the step 310, the CPU 200 detects the article code read out from the article stamp 113 by the code reader. The article code detected is compared with the article code stored in the register ACR in a step 312. When both the articles codes are coincident with each other, in a step 314, the price of the packed food is calculated on the basis of the unit price stored in the register RUPR, the tare data stored in the register RTR and weight data of the weight of the packed food from the weight measuring unit 210. In the step 312, when both the article codes are not coincident with each other, the unit price corresponding to the article code generated from the code reader 230, tare, department and data of effective date are read out from the PLU memory area of the RAM 204. The article code detected and the unit price data, the tare data, the department code, and the effective date data read out from the PLU memory area are written into the registers RACR, RUPR, RTR, RDR, and REDR. Afterwards, the final-effective-date data calculated on the basis of the packed date data in the register PDR and the updated effective-days data in the register REDR are loaded into the register FEDR, and the step 314 is executed. In the step 314, when the price is calculated, the calculated price data is loaded into the price register PR and the weight data from the weight measuring unit 210 is loaded into the weight register WR. The article code and the unit price data in the registers RACR and RUPR are then transferred to the display registers ACR and UPR and those data are displayed by the display unit 222.

In the next step 316, the label issuing condition is checked. The check is made as to whether, for example, the weight data from the weight measuring unit 210 is stabilized or not, and whether or not a signal designating that a label is present at the label issuing outlet 10 is generated from the detecting unit 226. As a result, when the label issuing is not permitted, the process returns to the step 300. On the other hand, when the label issuing is permitted, whether the auto-minus flag F3 is set at "1" or not is checked in a step 318. The flag F3 is set at "1" when the auto-minus key 53 is operated to effect separate total calculation. When the flag F3 is set at "1", 1 is subtracted from the number-of-packs data stored in the register NPR1 of first total memory area. The result of the subtraction is written into the register NPR1. At the same time, the weight and price data in the registers WR and PR are subtracted from the weight and price data in the registers TWR1 and TPR1 The results of the subtraction are respectively stored into the registers TWR1 and TPR1. After this, the flag F3 is reset, and the auto-minus lamp is turned off. In this case, the process is returned to the step 300 without issuing the label. In a step 318, whether or not the flag F3 is set at "0" is detected, and whether or not the addition switch 65 is set at the switching position T4 is checked in a step 320. When the addition switch 65 is set at the switching position "T4", the buzzer 232 is energized for a short time, the contents of the display registers WR and FR are added to the contents of the registers TWR4 and TPR4 of the fourth total memory area, and the result of the addition is written into the registers TWR4 and TPR4, while at the same time, 1 is added to the contents of the register NPR4. Also in this case, the process is returned to the step 300 without issuing the label. In the step 320, when the addition switch 65 is not set at the switching position "T4", then whether or not label switch 74 is set at the ON position is detected in a step 322. When it is detected that the label switch 74 is not set at the ON position, then whether the addition switch 65 is set at the switching position "T1−T3" or not is detected in a step 324. In the step 324, when the addition switch 65 is not set at the switching position "T1−T3", the process is returned to the step 300. On the other hand, when it is detected in the step 324, that the addition switch 65 is set at the switching position "T1−T3", after the buzzer 232 is energized for a short time, 1 is added to the contents of the register NPR1 of the first total memory area, in a step 326. The result of the addition is stored into the register NPR1. Further, in the same step, the contents of the display registers WR and PR are added to the contents of the registers TWR1 and TPR1, and the result of the addition is stored into the registers TWR1 and TPR1. After this, the process returns to the step 300.

In the step 322, when the label switch 74 is set at ON position is detected, the stamp unit 110 is energized to print the name of the article on the label 100. At the same time, the printer 104 is energized and the unit price data, weight data and price data from the registers UPR, WR and PR are printed on the first printing line of the label 100, as shown in FIG. 14, in a step 328. Then, in a step 330, the switching position of the printing switch 62 is checked. In the step 330, when it is detected that the printing switch 62 is set at "1 line" position, in a step 332 to be described later with reference to FIG. 12, the label is fed without a short distance feed. Then, in a step 334, it is checked whether or not the addition switch 65 is set at the switching position "T1−T3". In the step 334, when it is detected that the addition switch 65 is set at the switching position "T1−T3", a step 326 is executed and the process proceeds as described above. On the other hand, when the addition switch 65 is not set at the switching position "T1−T3", the process is returned to the step 300.

In the step 330, when it is detected that the printing switch 62 is set at "2 lines" position, in a step 336 as described later with reference to FIG. 13, the label is fed through a short distance. Then, in a step 338, the data from the manufactured or packed year register (not shown) of the RAM 204, the register PDR, the final effective year register (not shown), the register FEDR, the register RTR and the register PDR are printed on the second printing line of the label, as shown in FIG. 15. After this, in a step 340 as given later with reference to FIG. 12, the label is fed only a given distance.

With reference to FIGS. 6A to 6E, and 7 to 11, the processing operation of the key-in data in the step 304 will be described.

In the processing operation of the key-in data, in a step 400, whether the set key 47 is operated or not is first checked. When the operation of the set key 47 is detected, it is checked in a step 402 whether or not the switch 64 is set at the "PLU" position. In the step 402, when it is detected that the switch 64 is set at the "PLU" position, whether the PLU setting flag F10 is set or not at "1" is checked in a step 404. In the step 404, when it is detected that the flag F10 is set at "1", i.e., the readout operation of required data from the PLU memory area in the RAM 204 is completed, the PLU setting flag F10 is set at "0" and the process is returned to the main routine.

Meanwhile, when it is detected in the step 404 that the flag F10 is set at "0", then after the PLU setting flag F10 is set at "1", the B3 to B6 flags F4 to F7 are cleared in a step 406, and the article code stored in the register EACR is counted up by one count. Further, the display registers UPR, SR, WR, PR, NR, DR and ACR are all cleared, and the state indication lamps are all turned off. Then, in a step 408, the contents of the register EACR is transferred to the display register ACR, and the corresponding article code is displayed by the display unit 20-2. After this, the process is returned to the main routine.

In the step 402, when it is detected that the switch 64 is set at the "FEED" position, whether or not the feed setting flag F1 is set at "1" is checked in a step 410. When it is detected that flag F1 is set at "1", that is, the operation to feed the label a given distance is finished, the feed setting flag F1 is set at "0" and the feed (1) and feed (2) indication lamps are turned off. Then, the process is returned to the main routine.

In the step 410, when the feed setting flag F1 is set at "0", the flag F1 is set at "1", and the feed (1) and (2) indication lamps are turned on in a step 412. Then, the contents of the feed (1) register FR1 is transferred to the display register UPR. After the flag F2 is cleared, the corresponding data is displayed by the display unit 20-1. After this, the process is returned to the main routine.

Further, in the step 400, when a key operation other than by the set key 47 is detected, whether one of the ten keys 30 is operated or not is checked in a step 414. When operation of one of the ten keys 30 is detected, whether the feed setting flag F1 is set at "1" is checked in a step 416. In the event that the flag F1 is set at "1", the key data which is keyed in by the operation of the ten keys 30 is loaded into the numeral data register NDR, the numeral data of the numeral data register NDR is transferred to the display register UPR, and the numeral data is displayed on the display unit 20-1. Then, the process is returned to the main routine.

Figure 6A:
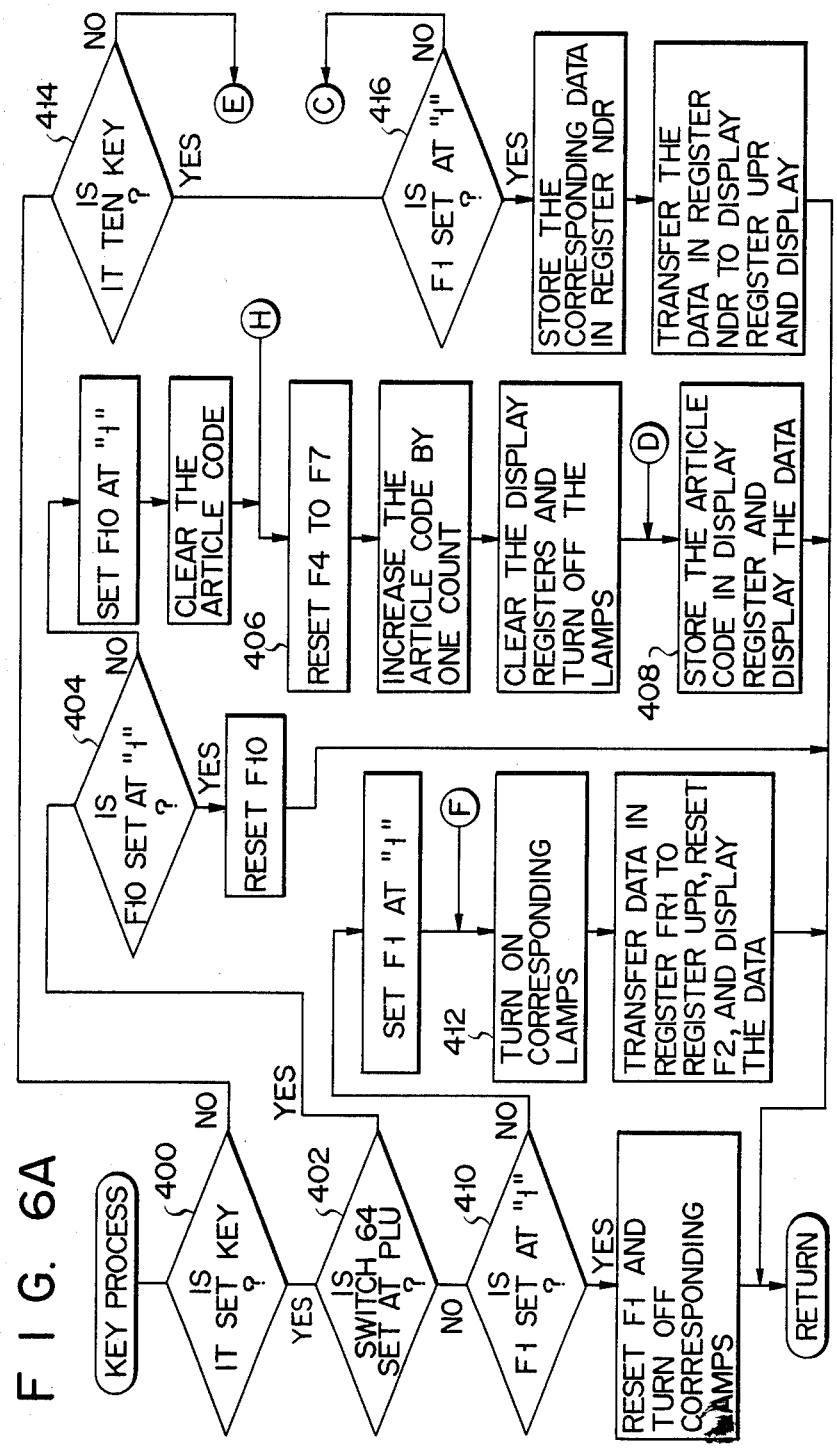
FIGS. 6A to 6B cooperate to form a flow chart illustrating a key processing operation in the flow chart in FIG. 5.
Figure 6B:
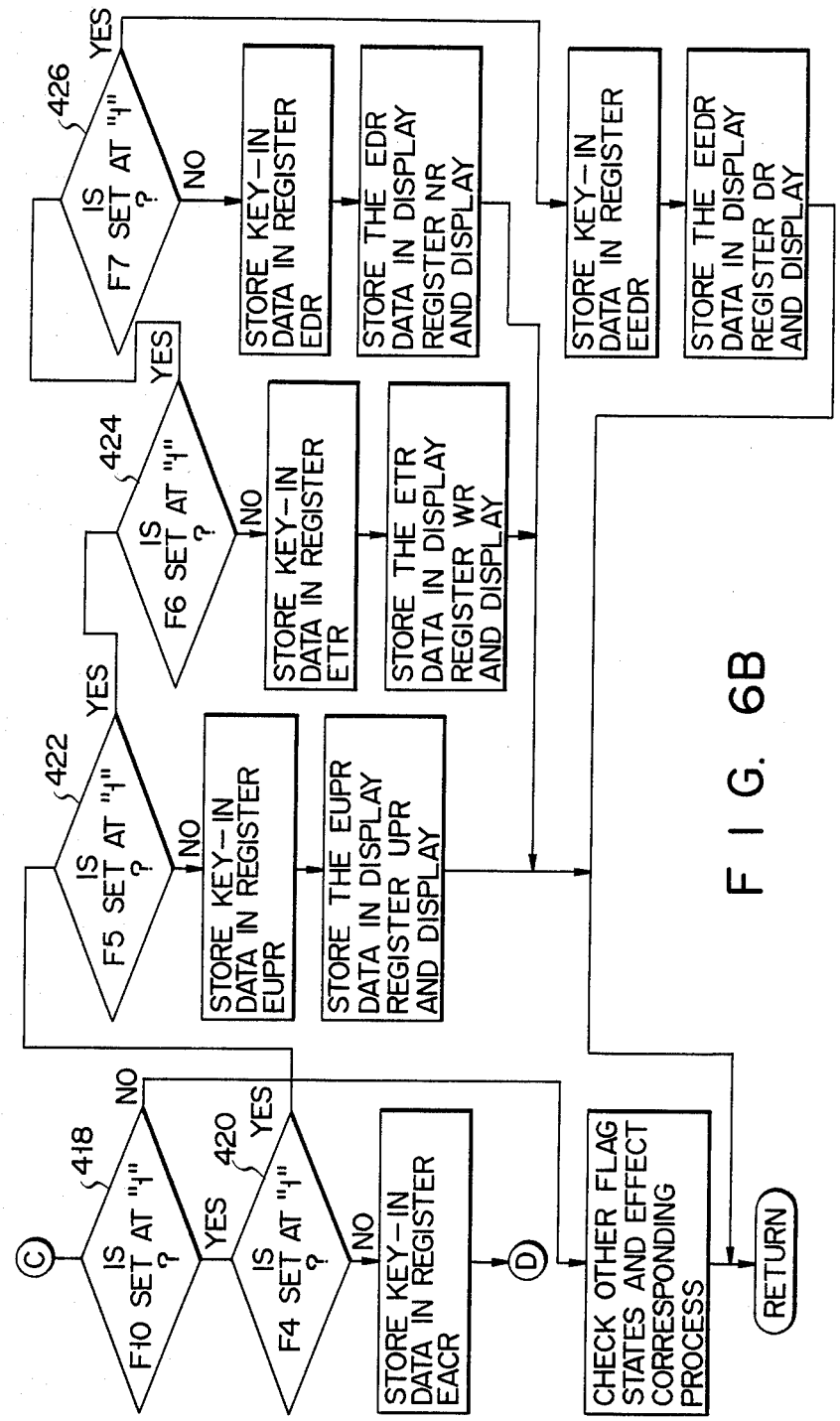

In the step 416, when that the feed setting flag F1 is set at "0" is detected, as shown in FIG. 6B, whether the PLU setting flag F10 is set at "1" is checked in a step 418. When it is detected that the PLU setting flag F10 is set at "0", the states of other flags are checked, and the process is returned to the main routine, following the execution of the corresponding processing operation.

In the step 418, when the PLU setting flag F10 is set at "1" is detected, whether the B3 setting flag F4 is set at "1" is checked in a step 420. Then, when it is detected that the B3 flag F4 is set at "0", the input data by the operation of the ten keys 30 is loaded into the register EACR as an article code. Following this, step 408

(FIG. 6A) is executed. Conversely, when it is detected that the B3 flag F4 is set at "1" in the step 420, whether the B4 flag F5 is set at "1" is checked in a step 422. When the B4 flag F5 is set at "0" is detected, the input data by the operation of the ten keys 30 is loaded into the register EUPR as price data, and the stored data of the register EUPR is transferred to the display register UPR and displayed on the display unit 20-1. Afterwards, the process is returned to the main routine. On the other hand, when the B4 flag F5 is set at "1" is detected in the step 422, whether the B5 flag F6 is set at "1" is detected in a step 424. If the B5 flag F6 is set at "0", the input data by the operation of the ten keys 30 is loaded into the register ETR as tare data. Then, the stored data of the register ETR is transferred to the display register WR and displayed on the display unit 20-1. After this, the process is returned to the main routine. Meanwhile, when the B5 flag F6 is set at "1" is detected in the step 424, whether the B6 flag F7 is set at "1" is checked in a step 426. When that the B6 flag F7 is set at "0" is detected, input data by the operation of the ten keys 30 is loaded into the register EDR as a department code. Then, the stored data of the register EDR is transferred to the display register NR and displayed on the display unit 20-2. On the other hand, where, in the step 426, it is detected that the flag F7 is set at "1", input data by the operation of the ten keys 30 is transferred to the register EEDR as effective-days data. Then, the stored data of the register EEDR is transferred to the display register DR and displayed on the display unit 20-2. After this, the process is returned to the main routine.

In a step 414 as shown in FIG. 6A, if none of the ten keys 30 is operated is detected, whether the clear key 35 is operated or not is checked in a step 428, as shown in FIG. 6C. When the operation of the clear key 35 is detected, whether the feed setting flag F1 is set at "1" is checked in a step 430. If the flag F1 is set at "1" is detected, the numeral data register NDR is then cleared, and the display device 20 is turned off. After that, the process is returned to the main routine. In the step 430, if the flag F1 is set at "0" is detected, whether or not the PLU setting flag F10 is set at "1" is checked in a step 432. In the case of "1" set in the flag F10, the B3 to B6 flags F4 to F7 are cleared, the registers EACR, EUPR, ETR, EDR and EEDR are all cleared, while at the same time the display device 20 is turned off. In the step 432, in the case of "0" set in the flag F10, states of the other flags are checked, and the corresponding processing operation is executed.

In the step 428, if the clear key 35 is not operated is detected, whether the execution key 31 is operated or not is checked in a step 434. When the execution key 31 is not operated is detected, operation states of the subtotal key 48 and first to fourth total keys 49 to 52 are checked, and the processing operations corresponding to the operated keys are executed as shown in FIG. 6E. If the operation of the execution key 31 is detected, whether or not the feed setting flag F1 is set at "1" is checked in a step 436. When the flag F1 is set at "1" is detected, whether or not the execution flag F2 is set at "1" is checked in a step 438. If the flag F2 is set at "1", the stored data representing a feed distance of the numeral data register NDR is transferred to the feed (2) register FR2, while at the same time count data representing the number of pulses corresponding to the stored data of the numeral data register NDR is loaded into the register PR2. After this, the step 412 shown in FIG. 6A is executed. In the step 438, if the flag F2 is set at "0" is detected, the data representing a feed distance loaded in the numeral register NDR is loaded into the feed (1) register FR1, while at the same time count data of the number of pulses corresponding to the feed distance data is stored into the pulse (1) register PR1. Then, the flag F2 is set at "1", the feed (1) indication lamp is turned off, and the feed (2) lamp is turned on. The count data of the feed (2) register FR2 is transferred to the display register UPR and displayed on the display unit 20-1.

Figure 6D:
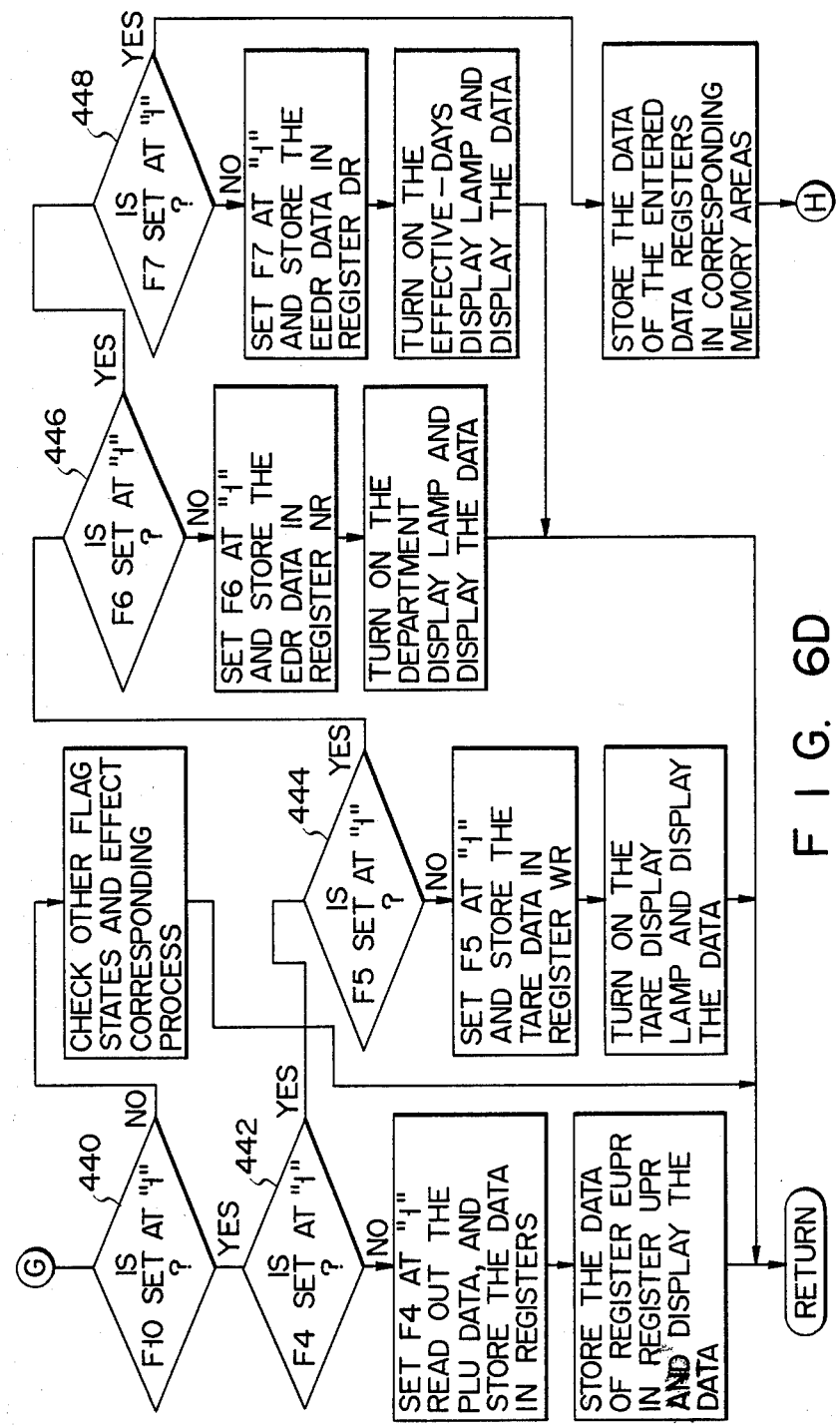
Figure 6E:
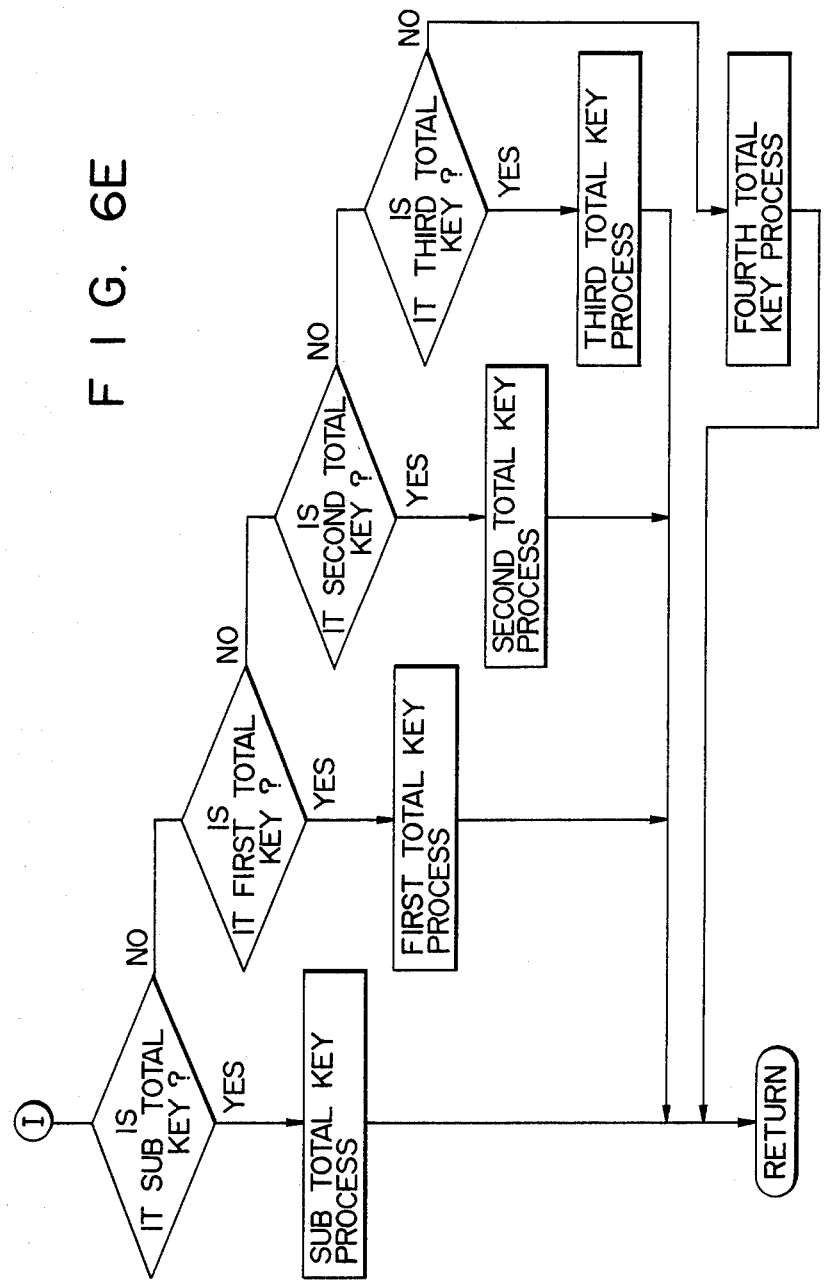

In the step 436, if the feed setting flag F1 is set at "0" is detected, whether or not the PLU setting flag F10 is set at "1" is checked in a step 440, as shown in FIG. 6D. When the flag F10 is set at "0" is detected, the states of other flags are checked, and the corresponding processing operation is executed. In the step 440, if the flag F10 is set at "1" is detected, whether or not the B4 flag F4 is set at "1" is checked in a step 442. When the B3 flag F4 of "0" is detected, the B3 flag F4 is set at "1", and the article code of the register EACR is loaded into the register RACR, while the data concerning the unit price, tare, department and effective days corresponding to the article code are read out from the PLU memory area, and the read out data are loaded into the registers RUPR, RTR, RDR and REDR. Then, the loaded data of the registers RUPR, RTR, RDR, and REDR are written into the respective registers EUPR, ETR, EDR and EEDR. Further, the unit price data stored in the register EUPR is loaded into the display register UPR, and displayed on the display unit 20-1. After that, the process is returned to the main routine.

Meanwhile, if the B3 flag F4 is set at "1" is detected in the step 442, and if the B4 flag F5 is set at "0" is detected in a step 444, the B4 flag F5 is set at "1", and the tare data stored in the register ETR is continuously loaded into the display register WR to turn ON the tare indication lamp, and to display the tare data on the display unit 20-1. If it is detected that the B4 flag F5 is set at "1" in the step 444 and the B5 flag F6 is set at "0" in step 446, the B5 flag F6 is first set at "1", the department code stored in the register EDR is loaded into the display register NR, and displayed on the display unit 20-2, while at the same time the tare indication lamp is lit.

Further, if the B5 flag F6 is set at "1" is detected in the step 446 and if the B6 flag F7 is set at "0" is detected in a step 448, the B6 flag F7 is first set at "1", the effective-days data stored in the register EEDR is loaded into the display register DR, and the effective-days data is displayed on the display unit 20-2, while the effective-days indication lamp is lit.

In the step 448, when the B6 flag F7 is set at "1" is detected, addresses in the PLU memory area to be preset are located on the basis of the article code stored in the register EACR, and the price data, tare data, section code and effective-days data stored in the registers EUPR, ETR, EDR and EEDR are written into the address locations. After that, the step 406 as shown in FIG. 6A is executed.

In the step 434, when the execution key 31 is not operated is detected and the subtotal key 48 is operated, the subtotal key 48 is set at "1" and all the displays are blanked as shown in FIG. 7.

In the case where the execution key 31 and the subtotal key 48 are not operated and when the first total key 49 is operated, whether the subtotal flag F8 is set or not at "1" is checked in a step 500 as shown in FIG. 8. If it is detected that the subtotal flag F8 is set at "0", after the first mark data (1 ◊) is stored into the print buffer register PBR, a step 502 is executed. If the flag F8 of "1" is detected, the second mark data (1 ∗) is loaded into the print buffer PBR and the step 502 is executed. In the step 502, the total weight data and the total price data stored in the registers TWR1 and TWR2 in the first total memory area are loaded into the print buffer register PBR. Subsequently, the contents of the print buffer register PBR and the article name data from the code reader unit 230 are printed on the label to feed the label by one line interval. Following this, the packed date data in the register PDR, the total number-of-packs data in the register NPR1 of the first total memory area, the time data from the timepiece circuit, and the department code in the register EDR are set in the print buffer register PBR and printed on the label. Then, the label is fed and issued from the label issuing outlet 10, as shown in FIG. 1. Subsequently, in a step 504, it is checked whether or not the subtotal flag F8 is set at "1". When it is detected that the subtotal flag F8 is set at "1", the flag F8 is set at "0". In step 506, it is checked whether or not the addition switch 65 is set at the switching position "T1—T3". If so done, the data stored in the registers NPR1, TWR1 and TPR1 in the first total memory area are added to the data stored in the registers NPR2, TWR2 and TPR2 in the second total memory area, respectively. Then, the results of the addition are respectively loaded into the registers NPR2, TWR2 and TPR2. In a step 508, the registers of the first total memory area are cleared. In the step 506, when it is detected that the addition switch 65 is not set at the switching position "T1—T3", the step 508 is executed and the processing operation of the first total key terminates.

Figure 9:
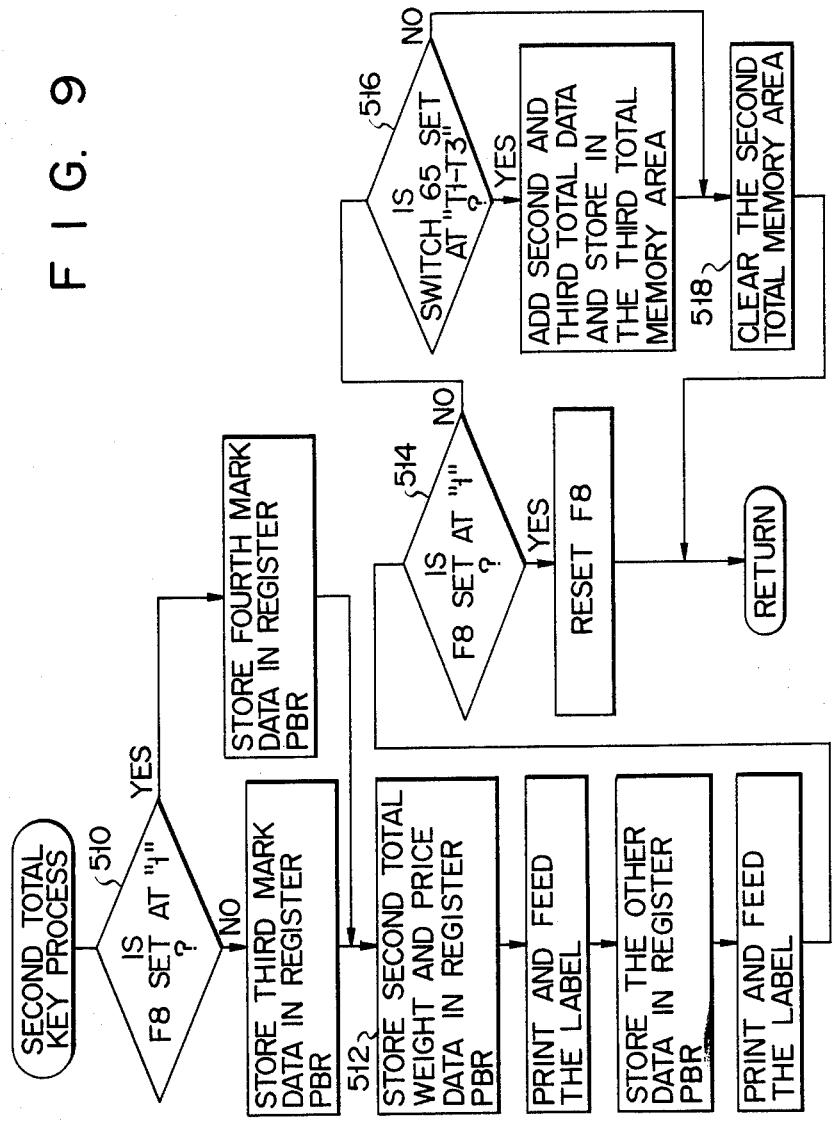

When the second total key 50 is operated in a step 510, as shown in FIG. 9, it is checked whether or not the subtotal flag F8 is set at "1". If the subtotal flag F8 is set at "0", the third mark data (2 ◊) is loaded into the print buffer PBR and then a step 512 is executed. When the subtotal flag F8 is set at "1", the fourth mark data (2 ∗) is loaded into the buffer register PBR and the step 512 is executed. In the step 512, the total weight and total price data stored in the registers TWR2 and TPR 2 in the second total memory are loaded into the print buffer register PBR. Following this step, the contents of the print buffer register PBR and the article name data read out by the code reader unit 230 are printed on a label and the printed label is fed by one line interval. Then, the packed date data in the register PDR, the total number-of-packs data in the register NPR2 of the second total memory area, the time data from the timepiece circuit 214 and the department code in the register EDR are loaded into the print buffer register PBR, and are printed on a label. Then, the printed label is issued from the issuing outlet 10. In the next step, it is checked whether or not the subtotal flag F8 is set at "1". When it is detected that it is set at "1", the flag F8 is cleared and the processing operation is completed. In the step 514, when the flag F8 is set at "0", it is checked in a step 516 whether or not the adder switch 65 is set at the switching position "T1—T3". When the adder switch 65 is not set to the switching position "T1—T3", in a step 518, the registers in the total memory area are cleared to finish the processing operation for the second total key 50. When it is detected that the adder switch 65 is set to the switching position "T1—T3", the data stored in the registers NPR2, TWR2 and TPR2 in the second total memory area are added to the data stored in the registers NPR3, TWR3 and TPR3 of the third total memory area, respectively. The results of the additions are loaded into the registers NPR3, TWR3 and TPR3, respectively. The step 518 is then executed.

Figure 10:
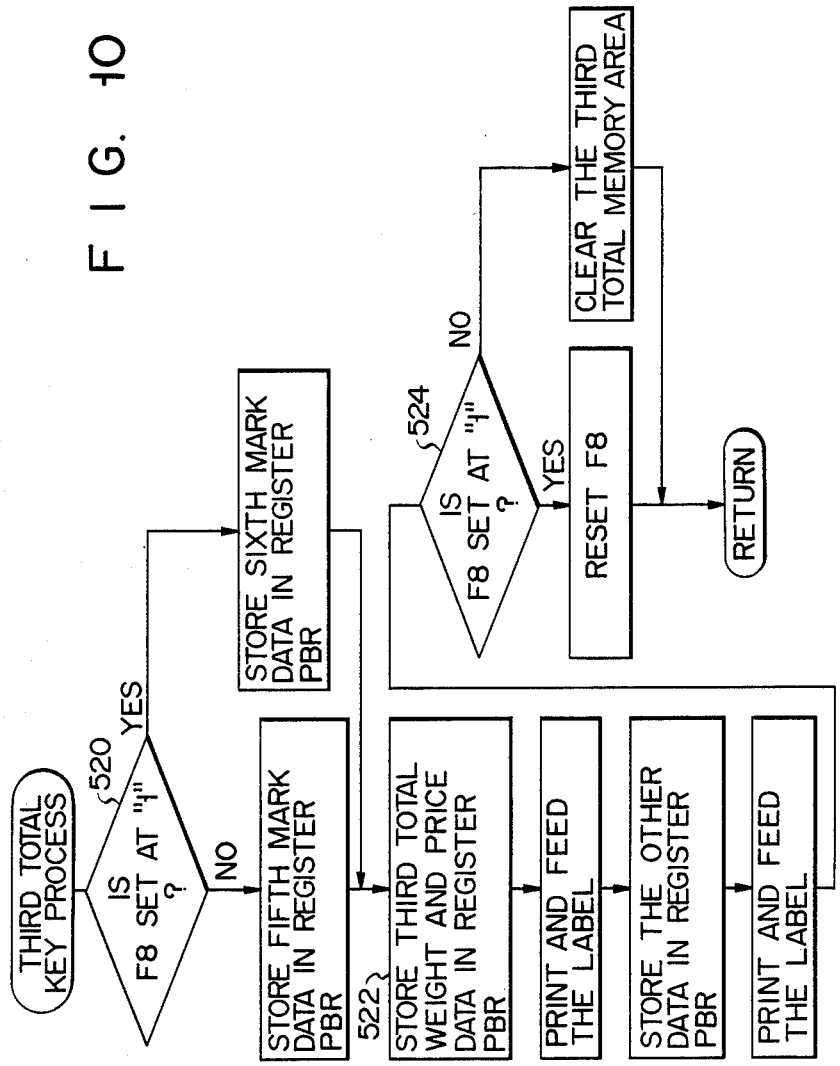

If it is detected in the step 434 that the execution key 31 is not operated, and in a case where none of the subtotal key 48, the first and second total keys 49, but 50 is operated and the third total key 51 is operated, whether the subtotal flag F8 is set at "1" or not is first checked in a step 520, as shown in FIG. 10. When the flag F8 is set at "0", the fifth mark data (3 ◊) is loaded into the print buffer register PBR and then a step 522 is executed. When the subtotal flag F8 is set at "1", the sixth mark data (3 ∗) is loaded into the print buffer register PBR and then the step 522 is executed. In the step 522, the total weight data and the total price data stored in the registers TWR3 and TPR3 of the third total memory area are loaded into the print buffer register PBR. Following this, the contents of the print buffer register PBR and the article name data from the code reader unit 230 are printed on a label and the printed label is fed by one line interval. After this, the packed date data stored in the register PDR, the total number-of-packs data stored in the register NPR3 of the third memory area, the time data from the timepiece circuit 214, and the department code in the register EDR are loaded into the buffer register PBR and the data are printed on the label. Then, in a step 524, whether or not the subtotal flag F8 is set at "1" is checked. When it is set at "1", the flag F8 is set at "0" and the processing operation for the operation of the total key 51 is finished. On the other hand, when the subtotal flag F8 is set at "0", the registers NPR3, TWR3 and TPR3 of the third total memory area are cleared.

Figure 11:
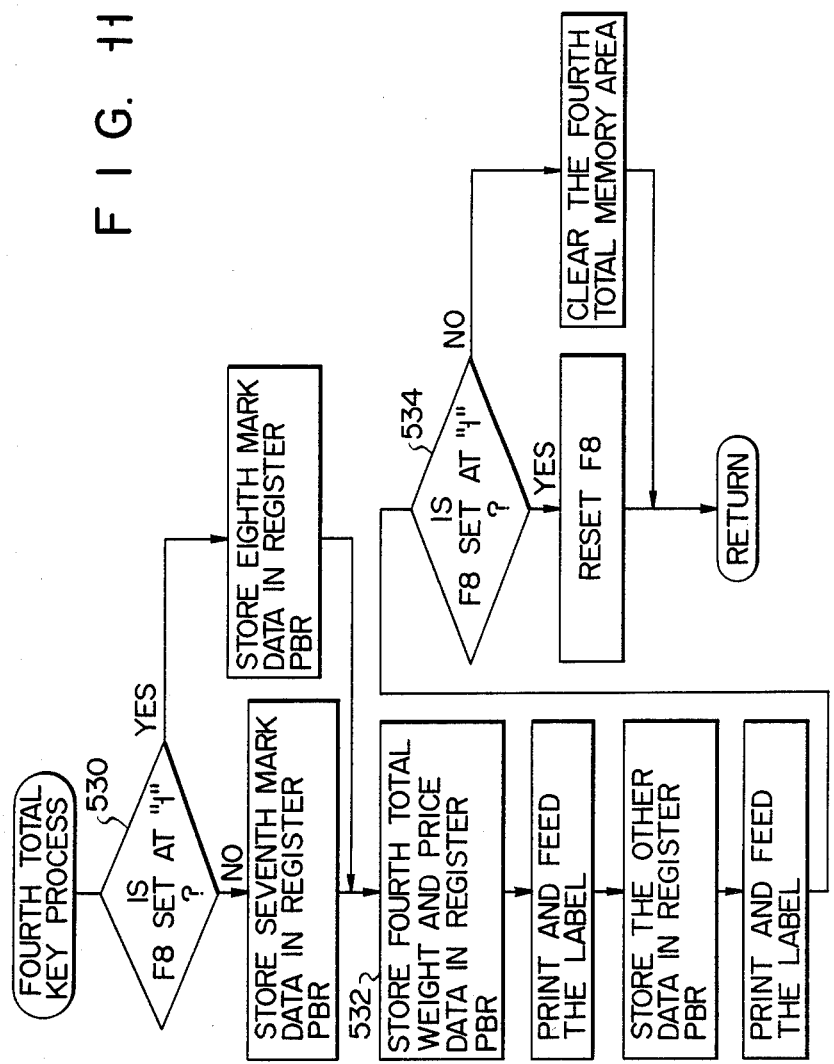

In a step 434, it is assumed to be found that the execution key 31 is not operated, none of the subtotal key 48, and the first to third total keys 49 to 51 is operated, but that the fourth total key 52 is operated. As shown in FIG. 11, in a step 530, whether or not the subtotal flag F8 is set at "1" is checked. If the flag F8 is set at "0", then the seventh mark data (4 ◊) is stored in the print buffer register PBR and a step 532 is executed. Conversely, if the subtotal flag F8 is set at "1", then the eighth mark data (4 ∗) is loaded into the print buffer register PBR and then the step 532 is executed. In the step 532, the total weight data and total price data stored in the registers TWR4 and TPR4 in the fourth total memory area are loaded into the print buffer register PBR. Afterwards, the contents of the print buffer register PBR and the article name data from the code reader unit 230 are printed on a label and the printed label is fed by one line interval. Then, the packed date data stored in the register PDR, the total number-of-packs data stored in the register NPR4 of the fourth total memory area, the time data from the timepiece circuit 214, and the department code in the register EDR are stored in the print buffer register PBR, and the data is printed on the label. Then, in a step 534, it is checked whether or not the subtotal flag F8 is set at "1". When it is detected that it is set at "1", the subtotal flag F8 is set at "0". Then, the processing operation for the fourth total key 52 ends. In the step 534, when it is detected that the subtotal flag F8 is set at "0", the registers NPR4, TWR4 and TPR4 of the fourth total memory area are cleared and the key processing operation ends.

Figure 12:
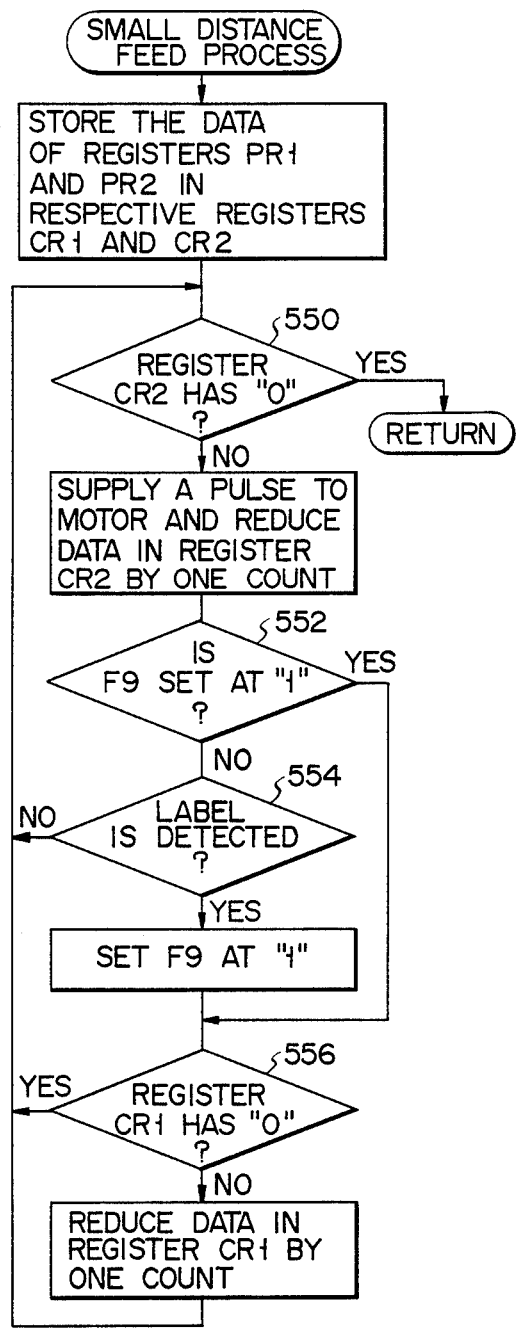
FIG. 12 illustrates a flow chart for explaining the processing operation of a short distance feed in the flow chart shown in FIG. 5.

FIG. 12 shows a flow chart illustrating the processing operation in the short distance feed step 336 shown in FIG. 5. Firstly, the contents of the pulse (1) register PR1 is stored in the first count register CR1 and the contents of the pulse (2) register PR2 are stored in the second count register CR2. In a step 550, whether or not the contents of the second count register CR2 is zero is checked. When the contents of the register CR2 are not zero, CPU 200 causes the motor control 216 to apply a control signal to the motor driver 224. Then, the motor driver 224 applies a drive pulse to the motor 126. As a result, the motor 126 is rotated by a given angle to feed the label through a given distance. Then, the contents of the count register CR2 are counted down by one count. Then, in a step 522, the state of the label detecting flag F9 is checked. As a result of the check, when the flag F9 is set at "0" is detected, it is further checked whether or not the label 100 is detected by the label detector 14 in a step 554. When the label 100 is absent at the label issuing outlet 10, the step 550 is performed. This operation repetitively continues until the label is detected by the detecting unit 14. In the step 554, when the label 100 is present at the label issuing outlet 10, the label detecting flag F9 is set at "1", and following this, whether or not the contents of the count register CR1 are "0" is checked in a step 556. When it is detected that the label detecting flag F9 is set at "1" in the step 552, the step 556 is also performed. In the step 556, if the contents of the count register CR1 are 0, then the step 550 is performed again. When the contents of the count register CR1 are not "0", the step 550 is performed after the contents of the count register CR1 are counted down by one count. This operation continuously repeats until the contents of the count register CR2 become 0. In the step 550, when it is detected that the contents of the count register CR2 are 0, the step 338 shown in FIG. 5 is performed.

Turning now to FIG. 13, there is shown the processing operation in the step 332 of FIG. 5. First, the data stored in the pulse (1) register PR1 is loaded into the first count register CR1. In the next step 560, it is checked whether or not the contents of the count register CR1 are 0. When it is not 0, CPU 200 causes the motor control 216 to provide a control signal to the motor driver 224. The motor driver 224 then supplies a single pulse to the motor 126. As a result, the motor 126 rotates at a given angle to feed the label through a given distance. To check the state of the label detecting flag F9, a step 562 is executed. In the step 562, when the flag F9 is set at "1", the step 560 is performed again after the contents of the first count register CR1 are counted down by one count in a step 564. When the label detecting flag F9 is not set at "0" is detected in the step 562, whether or not the label 100 is present at the label issuing outlet 10 is checked in a step 566. When the label 100 is not present at the label issuing outlet 10, the step 560 is performed. This operation continuously repeats until the label 100 is detected at the label issuing outlet by the detecting unit 14. When the presence of the label 100 at the label issuing outlet 10 is detected, the step 564 is executed after the label detecting flag F9 is set at "1". This operation continues in repetition until the contents of the count register CR1 become 0. When the 0 contents of the first count register CR1 are detected in the step 560, the label detecting flag F9 is set at "0" and then the feed processing terminates.

The feed step 340 in FIG. 5 is performed in a similar way to that of the feed step 332 without the short distance feed shown in FIG. 13, except that the step execution starts from the step 560 without storing the contents of the pulse (1) register PR1 into the first count register CR1.

When the label issuing apparatus thus far described is used, it is possible to issue a lable according to a request. For example, when it is desired to issue a label for individual packed food, the label switch 74 is turned ON. Owing to the ON state of the switch, given steps in the steps 328, 330, 334, 336 and 340 shown in FIG. 5 are executed and then a label printed with given data is issued from the label issuing outlet in the feed step 332 or 340. If the label switch 74 is set at an OFF position, the print operation and the feed operation of the label are not performed, and the weight and the price data of respective packed food are accumulatively added to the first total memory area. Then, after the weight data and the price data of the last packed food are added thereto, if the first total key 49 is operated directly or following the operation of the subtotal key 48, a label printed with the data stored in the first total memory area and the necessary data is issued from the label issuing outlet. In this way, the label can be issued in accordance with the request, thereby preventing unnecessary issuing of the labels.

As for those articles requiring a special custody such as inferior articles, the data of weight, price, etc. of the articles can accumulatively be added to only the fourth total memory area by setting the addition switch 65 to the switching position "T4". Then, by operating the fourth total key 52, labels bearing the total weight data and total price data in the fourth memory area are issued.

Further, in the present invention, for setting a feed distance of a label, the set data designating switch 64 is set at a "FEED" position at first, and then the set key 47 is operated. With this operation, a feed set flag F1 is set at "1" and feed (1) and feed (2) indicator lamps are lit. After this, the contents of the feed (1) register FR1 is displayed on the display unit 20-1 and the execution flag F2 is cleared simultaneously. Under this condition, distance data indicating a distance (mm) to be fed further after a label 100 is detected by a label detector 14 is written into the numeral data register NDR by operating the ten-keys 30. For example, when a distance of 70 mm is desired to be fed, the keys "7" and "0" of those ten keys are operated in this order to write the distance data indicating 70 mm into the numeral data register NDR, and also to store the data in an indicator register UPR. Then, the data is displayed on the display unit 20-1. After this, when the execution key 31 is operated, the 70 mm distance data stored in the numeral data register is written into the feed (1) register FR1, and at the same time, the data is written into the pulse (1) register PR1 after being converted into pulse data representing the number of pulses corresponding to 70 mm. In this case, the execution flag F2 is set at "1", while at the same time the feed (1) indicator lamp is turned off. Then, the contents of the feed (2) register FR2 is stored in the display register UPR to be displayed on the display unit 20-1. The conversion of the distance data to the pulse number data is executed as follows. Here, assume that the pulse motor 126 rotates 1.8° every time it receives a pulse, for example, and a pulley 124 rotates by 1/4.36 every time the motor 126 completes one rotation. In this case, 200 pulses are required for one-turn of the motor 126, and 872 pulses are required to rotate the pulley 124 once. If the diameter of the rubber roller 116 is 50 mm, the circumference of the same is 157 mm. Accordingly, the rubber roller 116 feeds the label by a distance of 157 mm/872 (=0.18 mm) every time the motor 126 receives one pulse. Therefore, 70/0.18 (=389) pulses are required to obtain a feed distance of 70 mm. In other words, the pulse (1) register PR1 stores the pulse data indicating 389 pulses in this embodiment.

Thereafter, when the ten key 30 is operated, a short feed distance data (mm), that is, distance data designating an interval between lines is written into the numeral data register NDR. For example, when the line interval is desired to be set at 5 mm, the distance data designating 5 mm is stored in the numeral data register NDR and also stored in the display register UPR, and displayed on the display unit 20-1 by operating the keys "5" of the ten key 30. Following this, when the execution key 31 is operated, since the execution flag F2 is set at "1" in this case, the distance data of 5 mm stored in the numeral data register NDR is written in the feed (2) register FR2 and the pulse number data corresponding to the distance data of 5 mm, or pulse number data designating 28 pulses, is written into the pulse (2) register PR2, simultaneously. Thus, when the two feed distance data are stored in the registers FR1 and FR2 and the two corresponding pulse number data are stored in the registers PR1 and PR2, both the feed (1) and feed (2) indicator lamps are lit and the contents of the feed (1) and feed (2) registers are displayed. Also, the execution flag F2 is cleared resulting in setting the original feed distance condition again except that the feed set flag F1 is set at "1". When the set key 47 is operated under this condition, the feed set flag F1 set at "1" is cleared, and the feed (1) and feed (2) indicator lamps are turned OFF to complete the setting operation of the feed distance.

As described above, the two types of label feed distances can be easily set by operating the set key 47, the ten keys 30, the execution key 31, the ten keys 30, the execution key 31 and the set key 47, in this order.

Thus, on the basis of the pulse number data stored in the pulse (1) pulse (2) registers PR1 and PR2, the short feed operation, or the operation for feeding the label by one line interval is executed, as shown in FIG. 12. To be more specific, the pulse number data first stored in the pulse (1) and pulse (2) registers PR1 and PR2 are respectively stored in the count registers CR1 and CR2. After this, the contents of the second count register CR2 is counted down by one count every time one pulse is supplied to the motor 126. The operation is continuously repeated until the contents of the count register CR2 is 0. In this case, if the label 100 is present at the label issuing outlet 10 and detected by the label detector 14 before the contents of the count register CR2 become 0, the contents of the first count register CR1 are also counted down, like that of the second count register CR2, every time a pulse is supplied to the motor 124. When the contents of the count register CR2 become 0, the label is printed on the second line. Then, the step 560 shown in FIG. 13 is executed. So long as the label is not detected at the issuing outlet 10 by the label detector 14, the motor driver 224 responds to a control signal from the motor control 216 to sequentially generate a drive pulse to rotate the pulse motor 126 by 1.8° for every pulse, for example. And when the label is fed and the presence of the label at the label issuing outlet is detected by the label detector 14, the contents of the first count register CR1 are counted down by one count every time the motor 126 is supplied with a pulse. The operation continues till the contents of the count register CR1 become 0.

In the case of a label feeding without any short distance feed, the motor 126 is driven in response to the pulses sequentially applied to the motor 126, while the counted contents of the count register CR1 is not counted down until the label detector 14 detects the label at the issuing outlet 10, as shown in FIG. 13. Then, if the label is detected at the label issuing outlet, the count contents of the count register CR1 are counted down by one count every time the motor 126 receives a drive pulse. The operation is repetitively executed till the contents of the count register CR1 become 0.

Thus, the short feed distance is determined by the stored data of the feed (2) register FR2, and the distance of the label feeding after the label is detected by the label detector 14 is determined by the stored data of the feed (1) register FR1. As a result, the label is fed by a distance corresponding to the distance data stored in the feed (1) register FR1 after the preceding label is detected by the label detector 14. Further, the preceding label is partially peeled from the ground paper tape 102 by a label peeling-off plate arranged for the peeling-off. The succeeding label is set at a proper printing position where it can be printed by a stamp unit 110 and a printer 104. In this situation, when the preceding label is peeled off, the succeeding label is allowed to be printed. When printing is required also at the second line of the label, the label is further fed through a distance corresponding to the contents of the feed (2) register FR2 and set at the second print position.

What we claim is:

1. A label issuing apparatus comprising:
   label feed means for feeding labels adhered on a label carrier;
   separator means for peeling said label off said label carrier,
   label detecting means disposed in the vicinity of said separator means for detecting that portion of said label which is peeled of said label carrier by said separator means;
   printing means for printing said label;
   data storing means having first and second memory areas for respectively storing first and second feed distance data;
   keyboard means having a plurality of keys selectively operative to write first and second feed distance data into said first and second memory areas said keyboard means including a first key, a second key and a plurality of numeral entry keys, and wherein said first feed distance data is produced and written into said first memory area by operating said first and numeral entry keys, and said second feed distance data is produced and written into said second memory area by subsequently operating said second and numeral entry keys; and
   data processing means for controlling said label feed means to feed said label carrier through a first distance defined by the first feed distance data stored in said first memory area after said label detecting means has detected a peeled-off front edge of said label and to set at least one of said labels in a first printing position, and after the label is printed in the first printing position, to feed said label carrier through a second distance defined by the second feed distance data stored in said second memory area from the first printing position.

2. A label issuing apparatus according to claim 1, wherein said data storing means further includes a third memory area, and said printing means includes a printer for printing data corresponding to the contents stored in said third memory area.

3. A label issuing apparatus according to claim 2, wherein said printing means is further provided with a printer for printing an article name on the label.

4. A label issuing apparatus according to claim 1, wherein said label detecting means produces a label detection signal upon detecting the peeled-off portion of said label to inhibit the printing operation of said printing means.

5. A label issuing apparatus comprising:
label feed means for feeding labels adhered on a label carrier;
separator means for peeling said label off said label carrier;
label detecting means disposed in the vicinity of said separator means for detecting that portion of said label which is peeled off said label carrier by said separator means;
printing means for printing said label;
data storing means having first and second memory areas for respectively storing first and second feed distance data;
keyboard means having a plurality of keys selectively operative to write first and second feed distance data into said first and second memory areas;
data processing means for controlling said label feed means to feed said label carrier through a first distance defined by the first feed distance data stored in said first memory area after said label detecting means has detected a peeled-off front edge of said label and to set at least one of said labels in a first printing position, and after the label is printed in the first printing position, to feed said label carrier through a second distance defined by the second feed distance data stored in said second memory area from the first printing position; and
said label detecting means producing a label detection signal upon detecting the peeled-off portion of said label to inhibit the printing operation of said printing means.

6. A label issuing apparatus according to any one of claims 1, 2, 3 or 5, wherein said keyboard means includes a control switch with first and second switching positions, and said data processing means inhibits said label feed means for operating upon detecting that said control switch is set in the second switching position.

7. A label issuing apparatus according to any one of claims 1, 2, 3 or 5, or wherein said data storing means further includes fourth and fifth memory areas for storing weight and unit price of an article, sixth and seventh memory areas for storing the total weight of articles, and eighth and ninth memory areas for storing the total price of the articles, said keyboard means includes a control switch with first and second switching positions, and said data processing means is arranged to calculate a price of the article on the basis of the weight and unit price stored in said fourth and fifth memory areas, to store accumulatively the data associated with the weight and price of the article when said control switch is in the first switching position, and to store accumulatively the data associated with the weight and price of the article into said seventh and ninth memory areas when said control switch is in the second switching position.

8. A label issuring apparatus according to claim 7, wherein said keyboard means includes third and fourth keys, said data processing means is arranged to transfer the total weight and price data stored in said sixth and eighth memory areas to said third memory area and to print the contents of said third memory area on the label by use of said printing means when said third key is operated, and to transfer the total weight and price data stored in said seventh and ninth memory areas to said third memory area and to print the contents of said third memory area on the label by use of said printing means when said fourth key is operated.

9. A label issuing apparatus according to any one of claims 1, 2, 3 or 5, wherein said keyboard means includes a control switch with first and second switching positions, and said data processing means inhibits said label feed means from feeding said label carrier through the second distance after the label is printed in the first printing position when said control switch is at the second switching position.

10. A label issuing apparatus according to claim 5, wherein said data storing means further includes a third memory area, and said printing means includes a printer for printing data corresponding to the contents stored in said third memory.

* * * * *

UNITED STATES PATENT AND TRADEMARK OFFICE
CERTIFICATE OF CORRECTION

PATENT NO. : 4,516,208
DATED : May 7, 1985
INVENTOR(S) : Yasuhiro SAKURA, et al

It is certified that error appears in the above-identified patent and that said Letters Patent is hereby corrected as shown below:

COLUMN 2, line 21, after "label" (first occurrence) delete "spacing"; insert the word --spacing-- before "intervals";

COLUMN 8, line 56, after "when" delete "that";

COLUMN 12, line 8, after "keys 49" delete ", but 50"; line 9, change "is operated and" to --and 50 is operated, but--;

COLUMN 13, line 15, after "in a step" change "522" to --552--;

COLUMN 15, line 15, after "operating the" change "keys" to --key--;

UNITED STATES PATENT AND TRADEMARK OFFICE
CERTIFICATE OF CORRECTION

PATENT NO. : 4,516,208

DATED : May 7, 1985

INVENTOR(S) : Yasuhiro SAKURA, et al

It is certified that error appears in the above-identified patent and that said Letters Patent is hereby corrected as shown below:

COLUMN 15, line 16, change "ten key 30" to --ten keys 30--;

COLUMN 17 (claim 6), line 46, change "claims 1, 2, 3 or 5" to --claims 1, 2, 3, 4 or 5--;

COLUMN 18 (claim 7), line 5, change "claims 1, 2, 3 or 5" to --claims 1, 2, 3, 4 or 5--;

COLUMN 18 (claim 9), line 35, change "claims 1, 2, 3 or 5" to --claims 1, 2, 3, 4 or 5--.

Signed and Sealed this

Seventeenth Day of December 1985

[SEAL]

Attest:

DONALD J. QUIGG

Attesting Officer

Commissioner of Patents and Trademarks